United States Patent [19]

Sakamoto et al.

[11] Patent Number: 4,836,349

[45] Date of Patent: Jun. 6, 1989

[54] CLUTCH TYPE TIGHTENING APPARATUS FOR ALLOWING FREE ADJUSTMENT OF TIGHTENING FORCE

[75] Inventors: Junshin Sakamoto; Shun Suzuki, both of Katsuta; Akinori Tsushima, Matsudo, all of Japan

[73] Assignee: Hitachi Koki Company, Ltd., Japan

[21] Appl. No.: 104,087

[22] Filed: Oct. 5, 1987

[30] Foreign Application Priority Data

Oct. 9, 1986 [JP] Japan ............................... 61-240744

[51] Int. Cl.[4] ............................................ F16D 43/20

[52] U.S. Cl. .................................... 192/56 R; 81/474; 173/12; 192/150

[58] Field of Search ................ 192/56 F, 150; 81/473, 81/474; 173/12

[56] References Cited

U.S. PATENT DOCUMENTS

| | | | |
|---|---|---|---|
| 2,683,512 | 7/1954 | Boice | 192/56 F |
| 2,702,619 | 2/1955 | Andershock | 192/56 F X |
| 3,205,986 | 9/1965 | Kramer | 192/56 F |
| 3,442,362 | 5/1969 | Bangerter | 173/12 X |
| 3,710,873 | 1/1973 | Allen | 173/12 |
| 3,960,035 | 6/1976 | Workman et al. | 192/56 F X |
| 4,019,589 | 4/1977 | Wallace | 173/12 |
| 4,265,320 | 5/1981 | Tanaka et al. | 173/12 |

FOREIGN PATENT DOCUMENTS 1752741 5/1971 Fed. Rep. of Germany .

*Primary Examiner*—Rodney H. Bonck
*Attorney, Agent, or Firm*—Lowe, Price, LeBlanc, Becker & Shur

[57] ABSTRACT

A tightening apparatus includes a drive motor and a bit are coupled to each other by engagement of a clutch mechanism, the engagement thereof being maintained by a force of a spring one end of which is coupled to the clutch mechanism and the drive motor is released from engagement with the bit when the tightening torque of the bit exceeds a value corresponding to the force of the spring. The tightening apparatus comprises a cylinder and a plunger encased in the cylinder for holding the other end of the spring. The plunger is movable by a drive mechanism such that the force of the spring is varied, whereby the tightening force to be applied to the bit is adjustable in accordance with the position of the plunger as adjusted by the drive mechanism.

6 Claims, 2 Drawing Sheets

CLUTCH TYPE TIGHTENING APPARATUS FOR ALLOWING FREE ADJUSTMENT OF TIGHTENING FORCE

FIELD OF THE INVENTION

The present invention relates generally to a tightening apparatus wherein a drive motor and a driven bit are coupled to each other by engagement of a clutch mechanism, and wherein they are disengaged with each other when the tightening torque of the driven bit exceeds a predetermined value; and, more particularly, to such a tightening apparatus which allows easy adjustment of the tightening force. The present invention is applicable particularly, but not exclusively, to electrical tools such as a powered screw-driver.

BACKGROUND OF THE PRIOR ART

One apparatus of this type as is well known in the art is so constructed that a tightening force adjusting spring is operatively associated with a manually operated dial and the pressing force of the spring is adjustable through rotation of the dial. The thus constructed apparatus has a disadvantage, however, that when it is required to change the tightening force in accordance with the kind of the member to be tightened, it requires interruption of the operation and work in progress because of the manual adjustment of the dial, and takes a long time. This problem is to particularly remarkable where the device is employed with a robot.

SUMMARY OF THE INVENTION

It is, therefore, an object of the present invention to provide a new and improved clutch type tightening apparatus which is capable of easily and freely setting the tightening torque to be applied to a bit.

This and other related objects are realized in accordance with the present invention, wherein there is provided a tightening apparatus including a drive motor and a bit which are coupled to each other by means of the engagement of a clutch mechanism, the engagement thereof being maintained by a force of a spring one end of which is coupled to the clutch mechanism, and wherein the drive motor is released from engagement with the bit when the tightening torque of the bit exceeds a value corresponding to the force of the spring. A feature of this invention is that the tightening apparatus comprises a cylinder and a plunger encased in the cylinder for holding the other end of the spring, the plunger being movable by means of drive means so that the force of the spring is varied whereby the tightening torque of the bit is adjustable in accordance with the position of the plunger taken by the drive means.

Preferably, the tightening apparatus further comprises a first adjustment ring which is movable in the direction of the axis of the tightening apparatus by its rotation. The first adjustment ring has stopper means whose position is varied in accordance with the rotation of the first adjustment ring and the stopper means restricts the movement of the plunger in one direction along the axis so that a maximum force of the spring is determined in accordance with the position of the stopper means. More preferably, the tightening apparatus further comprises a second adjustment ring which is also movable along the direction of the axis in accordance with its rotation. The second adjustment ring is coupled to the cylinder so that the plunger is movable in one direction along the axis in accordance with the movement of the cylinder caused by the rotation of the second adjustment ring and the movement of the plunger in the other direction along the axis is restricted by the cylinder whereby the minimum force of the spring is determined in accordance with the degree of the rotation of the second adjustment ring.

The plunger drive means comprises an air supply source which is coupled to the cylinder so that the plunger is moved in response to the supply of air from the air supply source. Thus, the tightening force can be easily and freely controlled by controlling the amount of air to be supplied into the cylinder.

BRIEF DESCRIPTION OF THE DRAWINGS

The objects and features of the present invention will become more readily apparent from the following detailed description of the preferred embodiment taken in conjunction with the accompanying drawings, in which.

DETAILED DESCRIPTION OF THE INVENTION

Figure 1:
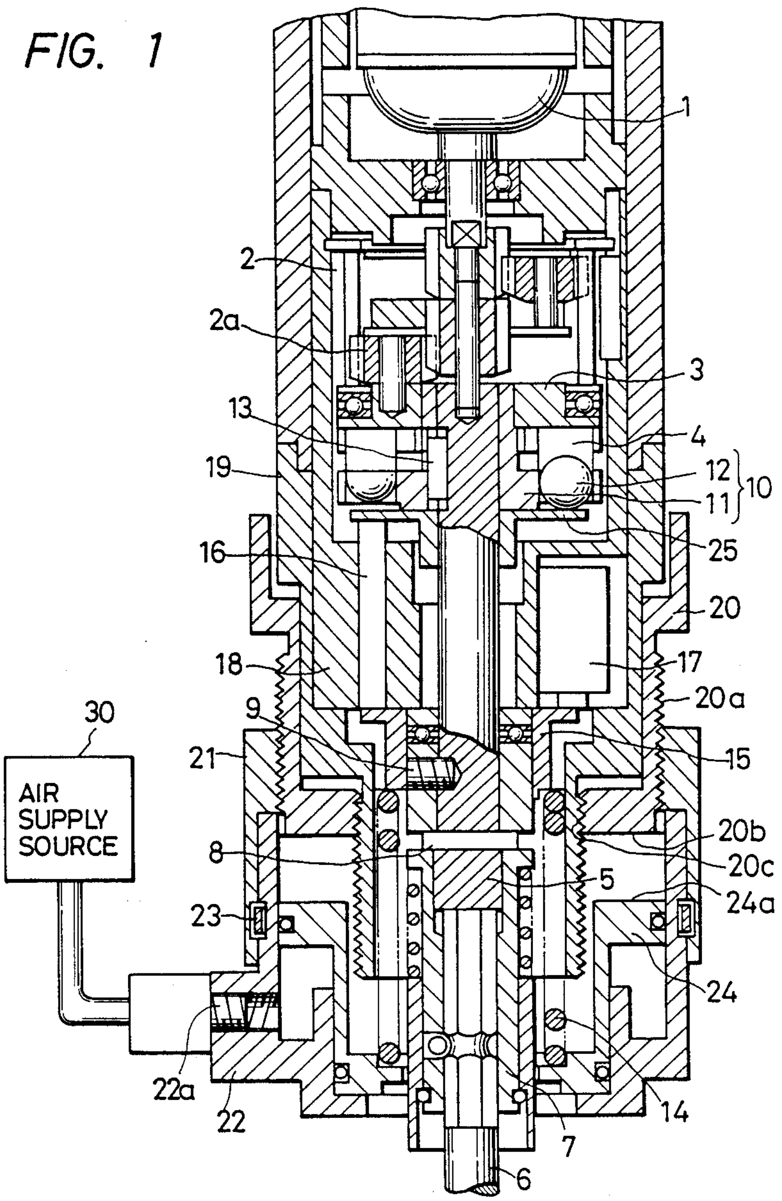
FIG. 1 is a cross-sectional view of a clutch type tightening apparatus of a preferred embodiment of the present invention.

Referring now to FIG. 1, there is illustrated a clutch type tightening apparatus according to an embodiment of the present invention comprising an electric motor 1, a reduction device 2 including planetary gears, and a fixed clutch 3 which supports the planetary gear 2*a* of the speed reduction device 2.

The fixed clutch 3 has a plurality of protrusively provided rollers 4 which function as a cam. Illustrated at the reference numerals 5 is a shaft, one end of which is connected to a socket 7 by means of a pin 8 and a screw 9, the socket 7 in turn holding a driver bit 6, and the other end of which is connected to a movable clutch 10 which comprises a rotating plate 11 and a steel ball 12, by means of a key 13 so that they are rotatable together with each other. The steel ball 12 is fitted in a hole of the rotating plate 11 and protrudes out of both the end surfaces of the rotating plate 11. The steel ball 12 is further pressed upwardly to the fixed clutch 3 and engaged therewith by means of a pressing force transmitted through a sleeve 15 and a pushing pin 16 from a tightening force adjusting spring 14. A limit switch 17 is provided for generating a stop signal to deenergize the electric motor 1 and is held by a gear cover 18. A top cover 19 is fixed to the gear cover 18 and has a threaded portion which is in turn engaged with a threaded portion 20*c* of a first adjustment ring 20 so that the first adjustment ring 20 is movable in either direction along the axis by means of its rotation. Another adjustment ring 21 has a threaded portion which is engaged with another threaded portion 20*a* so that the second adjustment ring 21 is also movable in the axial directions by its rotation. Also installed at the lower portion of the tightening apparatus is a cylinder 22 which has an air hole 22*a* and which is coupled to the second adjustment ring 21 by means of a snap ring 23. Provided in the cylinder 22 is a plunger 24 which is slidable in the axial directions and holds one end of the tightening force adjusting spring 14.

Operation of the clutch type tightening apparatus will be described hereinbelow.

In response to rotation of the electric motor 1, the rotating force thereof is introduced through the reduction device 2 into the fixed clutch 3 and the movable clutch 10 and further transmitted through the key 13, shaft 5 and socket 7 to the driven bit 6, resulting in tightening of a screw, for example. On reaching a predetermined tightening force, the steel ball 12 is moved downwardly (in the drawing) against the pressing force of the tightening force adjustment spring 14 and therefore the fixed clutch 3 is released from the engagement with the movable clutch 10, thereby resulting in interruption of the transmission of the rotating force from the electric motor 1 to the driver bit 6.

Furthermore, the steel ball 12 is arranged so as to push the sleeve 15 in the axial direction through another sleeve 25 and the pushing pin 16. The pushing operation allows the limit switch 17 to be operated to generate the stop signal and to stop the electric motor 1, thus resulting in the completion of the tightening operation for the screw. After going over a higher portion of the cam formed by the rollers 4, the steel ball 12 again presses the fixed clutch 3 by means of the pressing force transmitted from the tightening force of adjusting spring 14 through the sleeves 15, 25 and pushing pin.

Figure 2:
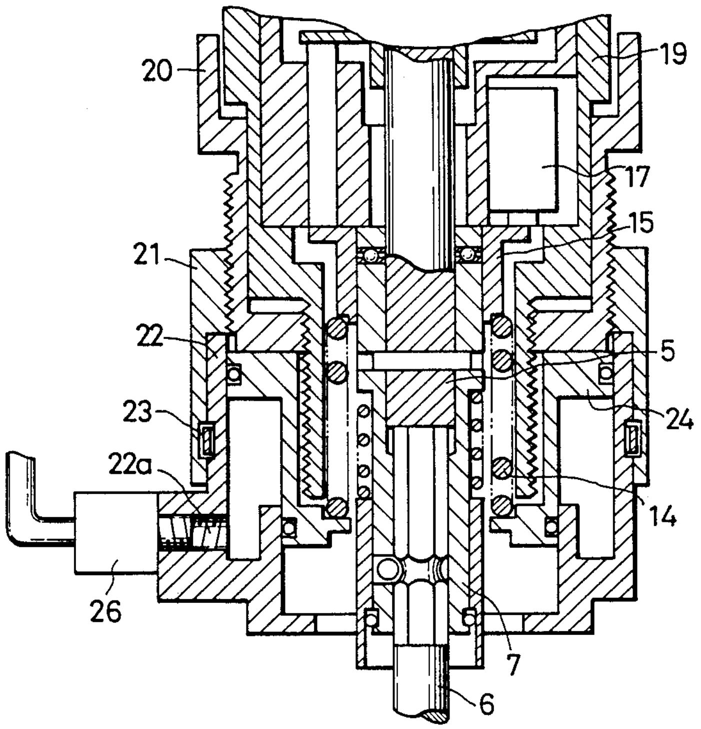
FIG. 2 is a sectional partial view illustrating a cylinder of the FIG. 1 tightening apparatus in the state of setting of the maximum tightening torque.

On the other hand, if air is supplied through the air hole *22a* into the cylinder 22, the plunger 24 in the cylinder 22 assumes the state as shown in FIG. 2, that is, it is moved upwardly, and this increases the pressing force of the spring 14. Thus, it will be understood that when the plunger 24 assumes the FIG. 2 state, the tightening torque for the screw attains a maximum value, thus allowing the control of the tightening force by the adjustment of the position of the plunger 24, i.e., the adjustment of the pressure of air introduced into the cylinder 22.

A description will hereinbelow be made in terms of the control of the tightening force.

First, the minimum tightening torque can be determined in accordance with the degree of rotation of the second adjustment ring 21. The rotation of the second adjustment ring 21 is transmitted thorugh the snap ring 23 to the cylinder 22 and the plunger 24 which are in turn moved in the axial direction and therefore the length of the spring 14, i.e., the compressive force thereof, is varied because of the variation of the position of the plunger 24, resulting in changing the pressing force to the sleeve 15. On the other hand, the maximum tightening torque can be determined in accordance with the degree of rotation of the first adjustment ring 20. The rotation of the first adjustment ring 20 causes a contact surface **20*b* thereof to move in the axial direction. When the plunger 24 is moved upwardly in response to the supply of air into the cylinder 22, a contact surface 24*a* of the plunger 24 comes into contact with the contact surface 20*b* thereof as shown in FIG. 2, that is, the contact surface 20*b* limits the upward movement of the plunger 24. In this case, the pressing force of the spring 14** assumes the maximum value.

The pressing force due to adjusting of spring 14 to the fixed clutch 3, can be varied within the range of the minimum and maximum values determined by the first and second adjustment rings 20 and 21 in accordance with the magnitude of the pressure of air supplied into the cylinder 22 from an air supply source 30. This source is arranged so as to allow the discharged air amount to be controlled manually or automatically in accordance with an electrical signal supplied from an external unit (not shown).

It should be understood that the foregoing relates to only a preferred embodiment of the present invention, and that it is intended to cover all changes and modifications of the embodiment of the invention herein used for the purposes of the disclosure, which do not constitute departures from the spirit and scope of the invention. For example, although in the above description air is supplied into the cylinder to move the plunger, it is also appropriate that a liquid is supplied thereinto or that the plunger is moved mechanically or electrically.

What is claimed is:

1. A tightening apparatus including a drive motor and a bit which are coupled to each other by engagement of a clutch mechanism, the engagement thereof being maintained by a force of spring means a first end of which is coupled to said clutch mechanism, wherein said drive motor is released from the engagement with said bit when the tightening torque of said bit exceeds a value corresponding to the force of said spring means, comprising:

cylinder means for encasing said spring means;

plunger means encased in said cylinder means for holding a second end of said spring means, said plunger means being movable within said cylinder means to move said second end so that the force of said spring means is thereby varied;

drive means for moving said plunger means, whereby the tightening torque of said bit is adjusted in accordance with a position of said plunger as determined by said drive means; and a first adjustment ring which is movable along the axis of said tightening apparatus by its rotation, said first adjustment ring having stopper means whose position is varied in accordance with the rotation of said first adjustment ring, said stopper means restricting the movement of said plunger means in one direction along the axis so that a maximum force of said spring means is determined in accordance with the position of said stopper means.

2. A tightening apparatus as claimed in claim 1, wherein:

said cylinder means has a port for introducing a pressurized fluid thereinto and said plunger drive means comprises a fluid supply source which is coupled to said fluid introducing port of said cylinder means, said plunger means being moved in response to the supply of fluid from said fluid supply source.

3. A tightening apparatus as claimed in claim 1, further comprising:

a second adjustment ring which is movable along the axis in accordance with its rotation, said second adjustment ring being coupled to said cylinder means so that said plunger means is movable along the axis in accordance with the movement of said cylinder means caused by the rotation of said second adjustment ring and the movement of said plunger means in the other direction along the axis is restricted by said cylinder means, whereby a minimum force of said spring means is determined in accordance with the degree of the rotation of said second adjustment ring.

4. A tightening apparatus as claimed in claim 3, wherein:

said cylinder means has a port for introducing a pressurized fluid thereinto and said plunger drive means comprises a fluid supply source which is coupled to said fluid introducing port of said cylinder means, said plunger means being moved in response to the supply of fluid from said fluid supply source.

5. A tightening apparatus including a drive motor and a bit which are coupled to each other by engagement of a clutch mechanism, the engagement thereof being maintained by a force of spring means a first end of which is coupled to said clutch mechanism, wherein said drive motor is released from the engagement with said bit when the tightening torque of said bit exceeds a value corresponding to the force of said spring means, comprising:

cylinder means for encasing said spring means;

plunger means encased in said cylinder means for holding a second end of said spring means, said plunger means being movable within said cylinder means to move said second end so that the force of said spring means is thereby varied;

drive means for moving said plunger means, whereby the tightening torque of said bit is adjusted in accordance with a position of said plunger as determined by said drive means; and an adjustment ring which is movable along the axis of said tightening apparatus in accordance with its rotation, said adjustment ring being movable in the axial direction in accordance with the movement of said cylinder means caused by the rotation of said adjustment ring and the movement of said plunger means in one direction along the axis being restricted by said cylinder means whereby a minimum force of said spring means is determined in accordance with the degree of the rotation of said adjustment ring.

6. A tightening apparatus as claimed in claim 5, wherein said cylinder means has a port for introducing a pressurized fluid thereinto and said plunger drive means comprises a fluid supply source which is coupled to said fluid introducing port of said cylinder means, said plunger means being moved in response to the supply of fluid from said fluid supply source.

* * * * *